US006698773B2

(12) United States Patent
Hsia (10) Patent No.: US 6,698,773 B2
(45) Date of Patent: Mar. 2, 2004

(54) DETACHABLE MOUNTING ARRANGEMENT FOR STROLLER FRONT GUARD

(76) Inventor: Ben M. Hsia, 19401 Business Center Dr., Northridge, CA (US) 91324

( * ) Notice: Subject to any disclaimer, the term of this patent is extended or adjusted under 35 U.S.C. 154(b) by 103 days.

(21) Appl. No.: 09/978,462

(22) Filed: Oct. 15, 2001

(65) Prior Publication Data

US 2003/0071442 A1 Apr. 17, 2003

(51) Int. Cl.[7] ................................................. B62B 9/24
(52) U.S. Cl. ..................... 280/47.38; 280/642; 108/152; 248/235
(58) Field of Search ................................ 280/642, 643, 280/644, 647, 648, 650, 87.051, 47.38; 297/148, 151, 152, 153, 174; 108/50.16, 110, 108, 152; 248/225.21, 243, 235

(56) References Cited

U.S. PATENT DOCUMENTS

| | | | |
|---|---|---|---|
| 3,305,244 A | | 2/1967 | Flagg |
| 3,605,929 A | | 9/1971 | Rolland |
| 4,064,996 A | * | 12/1977 | Shillum ....................... 211/191 |
| 4,108,085 A | * | 8/1978 | Shepherd et al. ........... 108/108 |
| 4,496,262 A | * | 1/1985 | Sangster ...................... 403/335 |
| 4,657,100 A | | 4/1987 | Lewis |
| D293,866 S | * | 1/1988 | Marsh .......................... D6/570 |
| 4,760,930 A | * | 8/1988 | Fox .............................. 211/153 |
| 4,856,809 A | * | 8/1989 | Kohus et al. ................ 280/644 |
| 5,022,621 A | * | 6/1991 | Quest ..................... 248/222.13 |
| 5,123,767 A | * | 6/1992 | Ishikura et al. ............... 403/24 |
| 5,180,184 A | | 1/1993 | Chiu |
| 5,201,540 A | | 4/1993 | Wu |
| 5,244,228 A | * | 9/1993 | Chiu ........................... 280/642 |
| 5,451,072 A | | 9/1995 | Weng |
| 5,551,716 A | | 9/1996 | Kordecki et al. |
| 5,582,419 A | | 12/1996 | Lucia et al. |
| 5,586,778 A | | 12/1996 | Lindh et al. |
| 5,669,625 A | * | 9/1997 | Jane Cabagnero .......... 280/647 |
| 5,769,447 A | * | 6/1998 | Huang ......................... 280/642 |
| 5,803,535 A | * | 9/1998 | Jane Cabagnero ....... 297/183.3 |
| 5,855,384 A | * | 1/1999 | Pike et al. ................. 280/47.38 |
| 5,964,501 A | * | 10/1999 | Magnani ................. 297/174 R |
| 6,045,145 A | * | 4/2000 | Lan .......................... 280/47.38 |
| 6,116,624 A | * | 9/2000 | Hu ......................... 280/47.371 |
| 6,120,053 A | | 9/2000 | DeAngelis |
| 6,123,314 A | * | 9/2000 | Steele ......................... 248/681 |
| 6,152,477 A | * | 11/2000 | Hsin et al. .................. 280/642 |
| D437,985 S | | 2/2001 | Wu |
| D438,357 S | | 2/2001 | Wu |
| 6,267,404 B1 | * | 7/2001 | Yang et al. ................. 280/642 |
| D448,906 S | | 10/2001 | Wu |
| 6,299,195 B1 | | 10/2001 | Chan |
| 6,302,430 B1 | | 10/2001 | Wu |
| 6,431,090 B1 | * | 8/2002 | Davis et al. ................ 108/107 |
| 6,447,001 B1 | * | 9/2002 | Hsia ........................... 280/642 |
| 6,478,503 B1 | * | 11/2002 | Cheng ..................... 403/322.4 |
| 6,487,978 B1 | * | 12/2002 | Hamberg .................... 108/108 |

OTHER PUBLICATIONS

Warner, Jr. et al., Tandem Stroller & Brake Assembly Thereof, Aug. 16, 2001, U.S. Patent Publication No. US 2001/0013688 A1.*

* cited by examiner

Primary Examiner—Brian L. Johnson
Assistant Examiner—Christopher Bottorff
(74) Attorney, Agent, or Firm—Raymond Y. Chan; David and Raymond Patent Group (57) ABSTRACT

A detachable mounting arrangement, for a stroller front guard adapted to transversely extend from a seat frame of the stroller to form a front boundary thereof, includes two joint members provided at two ends of the front guard for detachably mounting on the seat frame, wherein each of the joint members has a base joint having two supporting walls to mounted on the seat frame. Each joint member further has at least a locking slot provided on one of the supporting walls and has an opening formed at an edge of the respective supporting wall. Two locking shanks, which are provided on two sides of the seat frame, each has a neck portion protruded from the seat frame and arranged to slide into the locking slot so as to lock up the joint member on the seat frame.

8 Claims, 8 Drawing Sheets

DETACHABLE MOUNTING ARRANGEMENT FOR STROLLER FRONT GUARD

BACKGROUND OF THE PRESENT INVENTION

1. Field of Invention

The present invention relates to strollers, and more particularly to a detachable mounting arrangement for a front guard of a stroller wherein the front guard is facilitated to be attached to and detached from the stroller, so as to interchange the front guard such as a hand bar or a food tray to fit the need of the user.

2. Description of Related Arts

Stroller, which is becomes a necessity to every family having a young child or baby, is consider as a conveniences tool to carry the baby or young child during outdoor activities such as foot traveling and shopping.

A conventional stroller comprises a seat frame having two front supporting posts, a U-shaped handle bar, and a pair folding joints for pivotally connecting two upper ends of the front supporting posts with two lower ends of the handle bar in such that manner that the handle bar is capable of pivotally folding to the seat frame so as to fold up the stroller into a compact unit.

The conventional stroller further comprises a front guard mounted on a front portion of the seat frame to protect the baby or young child and thus functions as a hand bar for him or her to handle. Especially, when foot traveling, a vibration force may transfer to the stroller through the wheels such that the hand bar is extremely important to protect the young child and keep the young child in balance.

However, due to the position of the front guard with respect to the seat frame, the front guard may block the young child to get in and out the stroller. So, the parent must hug overhanging the young child into the stroller. Even though the front guard can be detached from the stroller, the original structure of the stroller must be altered to incorporate with the front guard, which will complicate the attaching/detaching operation. Thus, the attachment between the stroller and the front guard must be rigid enough to protect the young child. Since the young child is soft and weak, any mistake of the front guard may cause unwanted injury to the young child.

It is worth to mention that the front guard must be attached to the stroller in the right position which is the position of the folding joints. In order to minimize the alternation of the stroller, the front guard may either mount on the handle bar that is above the folding joints or mount on the front supporting posts that is below the folding joints. However, the design of the front guard must be altered to fit the stroller. In other words, two side arms of the front guard must be bent downwardly/upwardly when the front guard is mounted above/below the folding joints. Therefore, the front guard will be manufactured to have a bulky size that losses most of the ordinary features such as simple construction and portable of the front guard.

Moreover, while having a stroll, the parent may merely carry the stroller when the parent runs up/down stairs. However, the parent may pull the stroller upwardly with the front guard and the handle at the same time so as to carry the stroller. It is extremely dangerous when the front guard is not securely attached to the stroller such that the stroller may be flipped over accidentally which will cause serious injury to the young child.

Thus, the hand bar has nothing to do when the young child is eating. When serving the young child, the parent must carry the food on one while another hand must take care the young child, which is a hassle especially for single parent. So, a food tray is a good idea to incorporate with the stroller for placing the food on the tray.

SUMMARY OF THE PRESENT INVENTION

A main object of the present invention is to provide a detachable mounting arrangement for stroller front guard of a stroller wherein the front guard can be quickly and easily attached to and detached from the stroller.

Another object of the present invention is to provide a detachable mounting arrangement for stroller front guard of a stroller, wherein the attachment of the front guard is improved in both safety and operability. The front guard is interlocked with the stroller as in one single action and is advantageous in practical use.

Another object of the present invention is to provide a detachable mounting arrangement for stroller front guard of a stroller, wherein the front guard is securely mounted on the stroller frame by a pin-in-slot engagement so as to prevent up and down or sideward movement of the front guard with respect to the stroller. In other words, the front guard is firmly attached to the stroller even through an upward force is applied on the front guard to carry the stroller running up/down stairs.

Another object of the present invention is to provide a detachable front guard for a stroller, which does not require to alter the original structural design of the stroller, so as to minimize the manufacturing cost of incorporating the front guard with the stroller.

Another object of the present invention is to provide a detachable front guard for a stroller that is adapted to be installed to all kinds of stroller because no specific modification is required for the stroller to adapt the front guard.

Another object of the present invention is to provide a detachable mounting arrangement for stroller front guard of a stroller, wherein the front guard is interchangeable such as a hand bar or a food tray so as to fit the need of the user.

Accordingly, in order to accomplish the above objects, the present invention provides a stroller which comprises seat frame comprising two front legs, a handle frame, and a pair of foldable joints for pivotally connecting two upper ends of the two front legs with two lower ends of the handle frame.

The stroller further comprises a detachable mounting arrangement which comprises a front guard and a pair of coupling means for detachably coupling two ends of the front guard with the two foldable joints of the seat frame respectively. The coupling means comprises two joint members provided at the two ends of the front guard for detachably mounting on the two foldable joints respectively, a pair of first secure members provided on the two foldable joints respectively and a pair of second secure members provided on the joint members and arranged to securely engaged with the first secure members respectively so as to firmly mount the front guard to the stroller.

DETAILED DESCRIPTION OF THE PREFERRED EMBODIMENT

Figure 1:
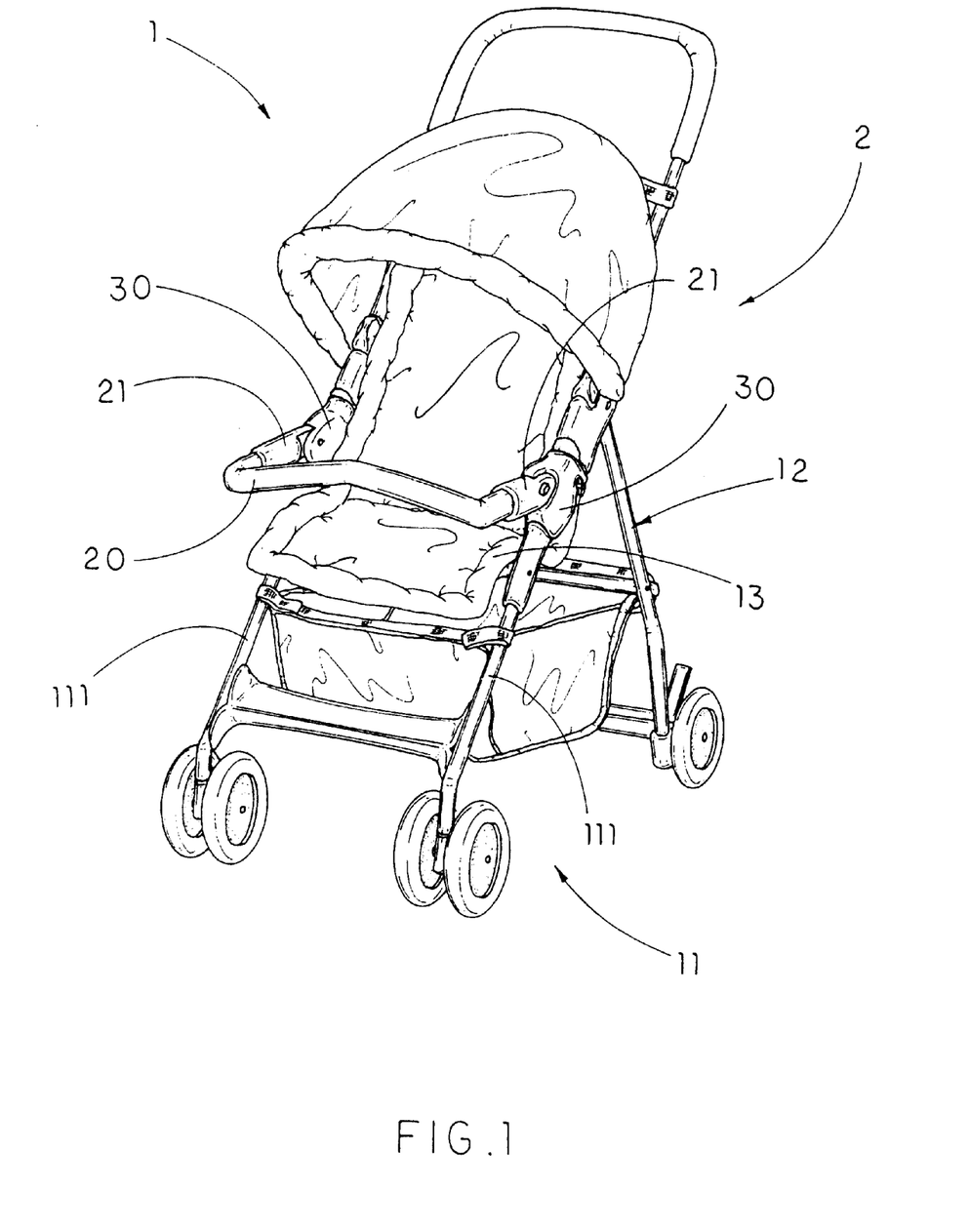
FIG. 1 is a perspective view of a stroller incorporated with a detachable mounting arrangement according to a first preferred embodiment of the present invention.

Referring to FIG. 1 of the drawings, a stroller 1 incorporated with a detachable mounting arrangement 2 according to a preferred embodiment of the present invention is illustrated. The stroller 1, such as a standard stroller, comprises a seat frame 13 and a handle frame 14. The seat frame comprises a front frame 11 having a pair of front legs 111 and a back frame 12 constructed to support a fabric seat thereon.

The seat frame 13 further comprises a pair of foldable joints 131 for pivotally connecting two upper ends of the front legs 111 with two lower ends of the handle frame 14 such that the handle frame 14 is capable of pivotally folding to the seat frame 13, so as to fold up the stroller 1.

Figure 2:
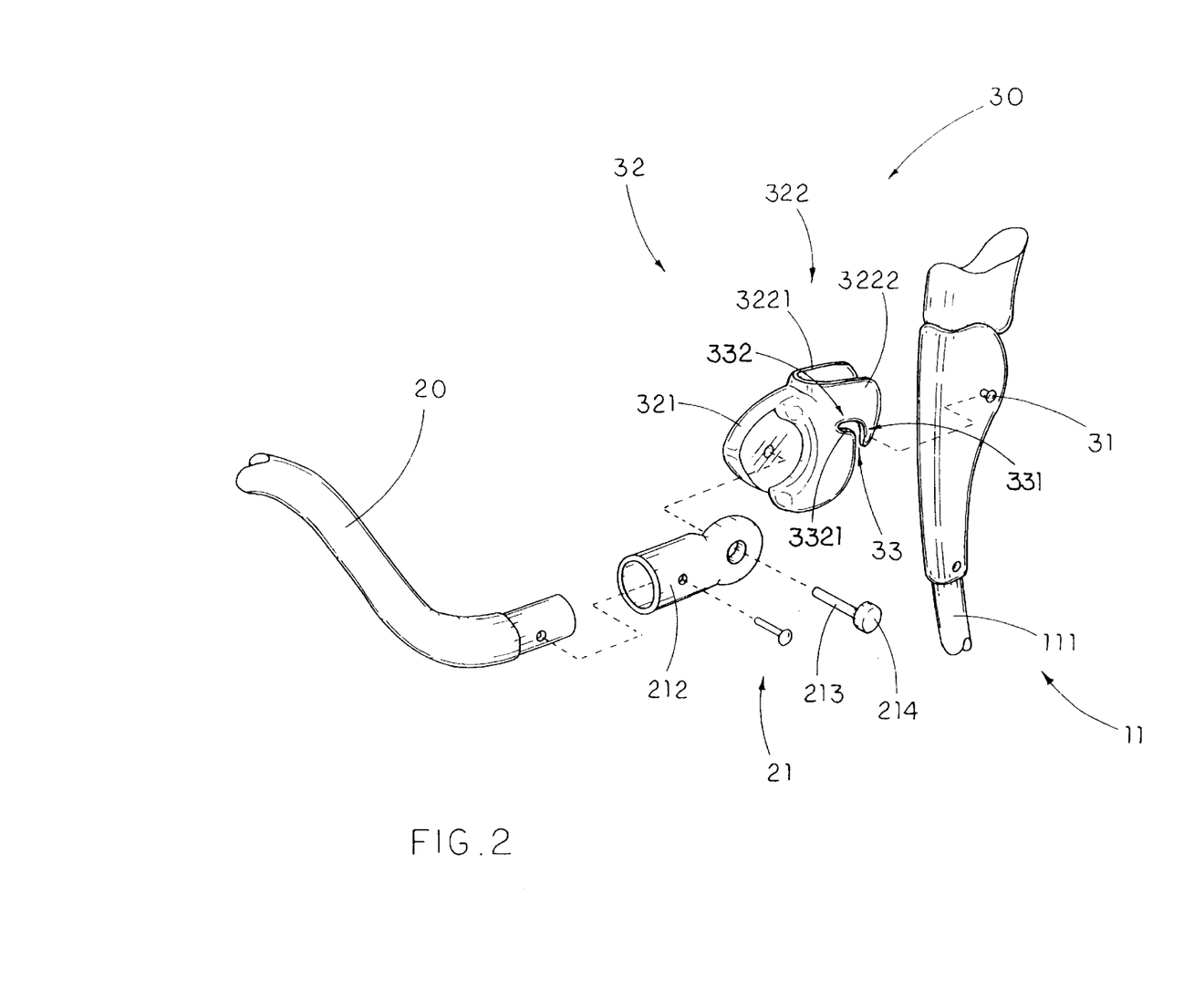
FIG. 2 is an exploded perspective view of the detachable mounting arrangement of the above first preferred embodiment of the present invention.

As shown in FIG. 2, the detachable mounting arrangement 2 comprises a front guard 20 and a pair of coupling means 30 for detachably coupling two ends of the front guard 20 with the two foldable joints 131 of the seat frame 13 respectively. The coupling means 30 comprises two joint members 32 provided at the two ends of the front guard 20 for detachably mounting on the two foldable joints 131 respectively, a pair of first secure members 31 provided on the two foldable joints 131 respectively and a pair of second secure members 33 provided on the joint members 32 and arranged to securely engaged with the first secure members 31 respectively so as to firmly mount the front guard 20 to the stroller 1.

According to the preferred embodiment, the front guard 20 is transversely extended from the seat frame 13 and positioned above the fabric seat to form a front boundary of the stroller 1 to restrict the frontward movement of the young child sat on the fabric seat so as to prevent the young child fall down at the front of the stroller 1 accidentally.

The two first secure members 31 are two locking shanks 31 opposedly and outwardly protruded from the two foldable joints 131 of the seat frame 13 respectively. Each of the locking shanks 31 is a rivet perpendicularly mounted on an outer side of the respective foldable joint 131 wherein a predetermined length of a neck portion of the rivet is protruded from the foldable joint 131. Accordingly, each of the locking shanks 31 is a part of the foldable joint 131 of the stroller 1 for pivotally connecting the front legs 111 with the handle frame 14, such that no new part is required to add into the stroller 1. Otherwise, an additional rivet can be mounted to the foldable joint 131 to form the locking shanks 31, which will maintain in low cost.

Each of the joint members 32 comprises a head joint 321 to connect the end of the front guard 20 and a base joint 322 having a U-shaped cross section comprising two parallel supporting walls 3221, 3222 to fittedly mount the respective foldable joint 131 therebetween.

Each of the second secure members 33 is formed on one of the supporting walls 3221, 3222 in such a manner that when the base joint 322 is mounted on the foldable joint 131, the locking shank of the first secure member 31 is engaged with the second secure member 33, so as to lock up the joint member 32 on the foldable joint 131. Accordingly, each second secure member 33 is an elongated locking slot inclinedly extended from an edge of the supporting wall 3222 wherein an opening of the locking slot 33 is provided at a bottom portion of the supporting wall 3222 to provide a quick and easy attachment that requires an inclinedly slide-down action to engage the locking slot 33 with the locking shank 31 when the base joint 322 is slidably mounted on the foldable joint 131.

As shown in FIG. 2, the locking slot of the second secure member 33 has a guiding portion 331 extended from upwardly and inclinedly from the edge of the respective supporting wall 3222 to define an open end and a locking portion 332 transversely extended from the guiding portion 331 to define a closed end. Therefore, in order to detachably attach the second secure members 32 to the first secure members 31 respectively, each locking shank of the first secure members 31 is upwardly slid along the guiding portion 331 of the locking slot of the second secure member 32 at the open end thereof and then transversely slid the locking portion 332 of the locking slot of the second secure member 32 until the locking shank of the first secure member 31 reaches the closed end of the locking slot of the second secure member 32.

It is worth to mention that a bottom wall 3321 of the locking portion 332 of the locking slot of the second secure member 32 will block up the upward movement of the locking shank of the first secure member 31, so as to prevent the front guard 20 from being slid out of the locking slot of the second secure member 32 accidentally. In order to detach the second secure member 32 from the first secure member 31, the base joint 322 must be pulled frontwardly to move the locking shank of the first secure member 31 from the locking portion 332 of the locking slot to the guiding portion 331 thereof. Then, a downward force must be applied on the base joint 322 in order to slide the locking shank 31 out the guiding portion 331 of the locking slot of the second secure member 32. In other words, due to the dual-directional detaching operation of the coupling means 30, the user is able to carry the stroller 1 by upwardly pulling the front guard 20 safely.

Figure 3:
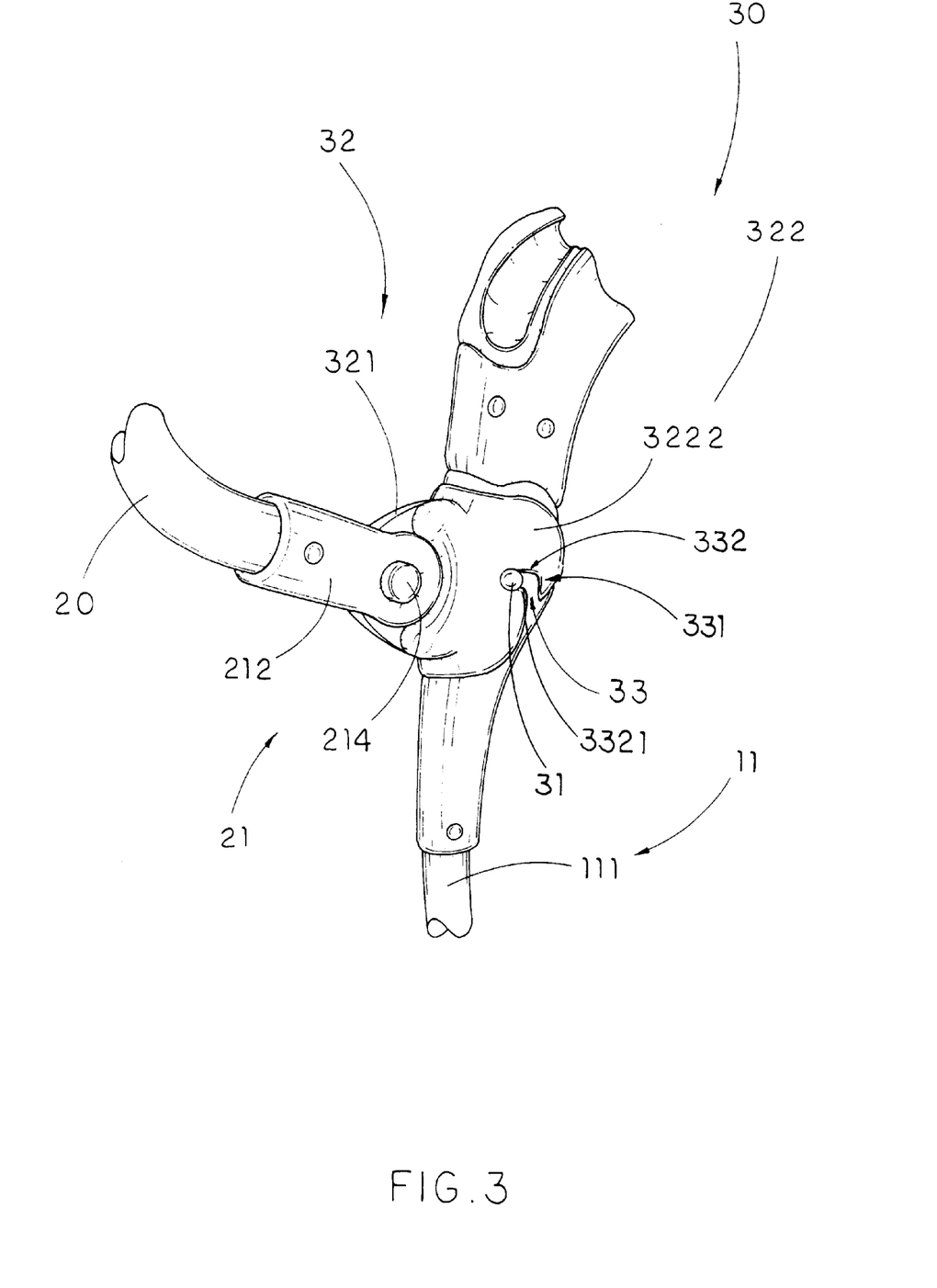
FIG. 3 is perspective view of a coupling means of the detachable mounting arrangement mounted on the stroller according to the above first preferred embodiment of the present invention.

As shown in FIG. 3, the two supporting walls 3221, 3222 of the base joint 322 has a distance slightly larger than a width of the foldable joint 131 such that when the joint member 32 is mounted on the foldable joint 131, two inner surfaces of the supporting walls 3221, 3222 are biased against the foldable joint 131 in a sandwiched manner. So, when the locking shank 31 is engaged with the locking slot 33, the front guard 20 is securely mounted on the seat frame 13 so as to prevent an unwanted movement of the front guard 20 with respect to the seat frame 13.

As shown in FIG. 2, the front guard 20 is a hand bar having two ends rotatably connected to two coupling means 30 by a pair of pivot joints 21 wherein each of the pivot joint 21 comprises a guider holder 212, which is firmly attached to the end of the front guard 20, pivotally attached to the head joint 321 of the joint member 32 by a shaft 213, and a locker button 214 provided on an outer side of the guider holder 212 and arranged for selectively locking and unlocking a rotation movement of the front guard 20 with respect to joint member 32 of the coupling means 30. In other words, for rotating the front guard 20, inward forces must be intentionally applied on the two locker buttons 214 in order to freely rotate the front guard 20. So, the parent is able to rotatably adjust the front guard 20 at an adequate position for the young child to handle.

In order to attach the detachable mounting arrangement 2 to the stroller 1, a pulling force F1 must be intentionally applied on the coupling means 30 to the seat frame 13 so as to mount the foldable joint 131 between the two supporting walls 3221, 3222 of the base joints 322 of the joint members 32 respectively. Then, an inclinedly slide-down force F2 is applied on the coupling means 30 to engage the locking slots 33 with the locking shanks 31 for locking the coupling means 30 on the foldable joint 131 respectively, so as to securely attach the front guard 20 to the seat frame 13 of the stroller 1. It is worth to mention that in order to detach the detachable mounting arrangement 2 from the stroller 1, the coupling means 30 must be pulled inclinedly and upwardly in a position that the locking shanks 31 are moved out of the locking slots 33 respectively so as to prevent the front guard 20 being detached from the seat frame 13 of the stroller 1 accidentally, especially by the young child.

Figure 4:
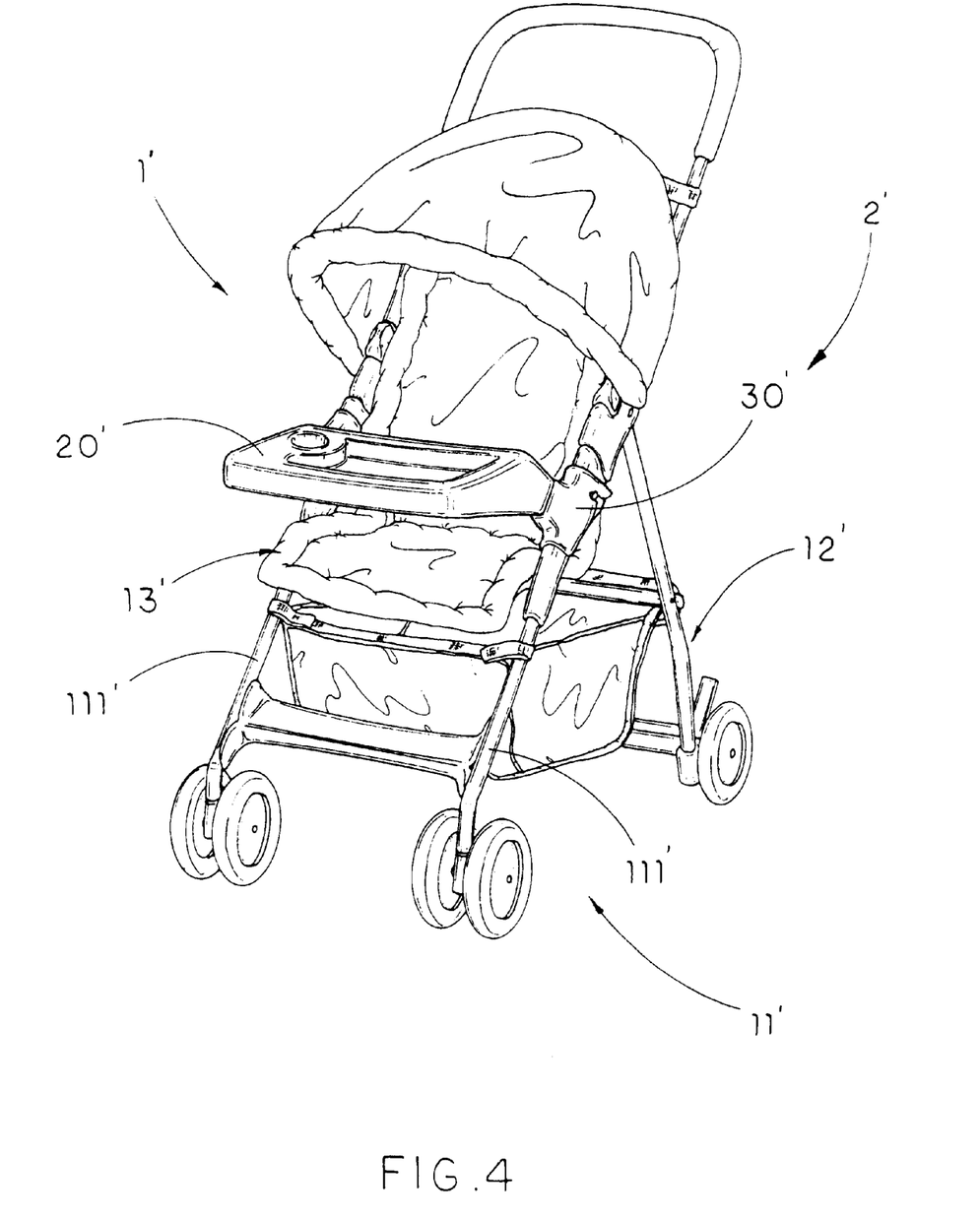
FIG. 4 is a perspective view of a detachable mounting arrangement of a second preferred embodiment of the present invention.

Referring to FIG. 4, a second embodiment illustrates an alternative mode of the detachable mounting arrangement 2' of the first embodiment, wherein the front guard 20', which is a food tray instead of the hand bar of the first embodiment, is detachably attached to the coupling means 30' in such a manner that the food tray of the front guard 20' can be detached from the stroller 1' for cleaning purpose.

Figure 5:
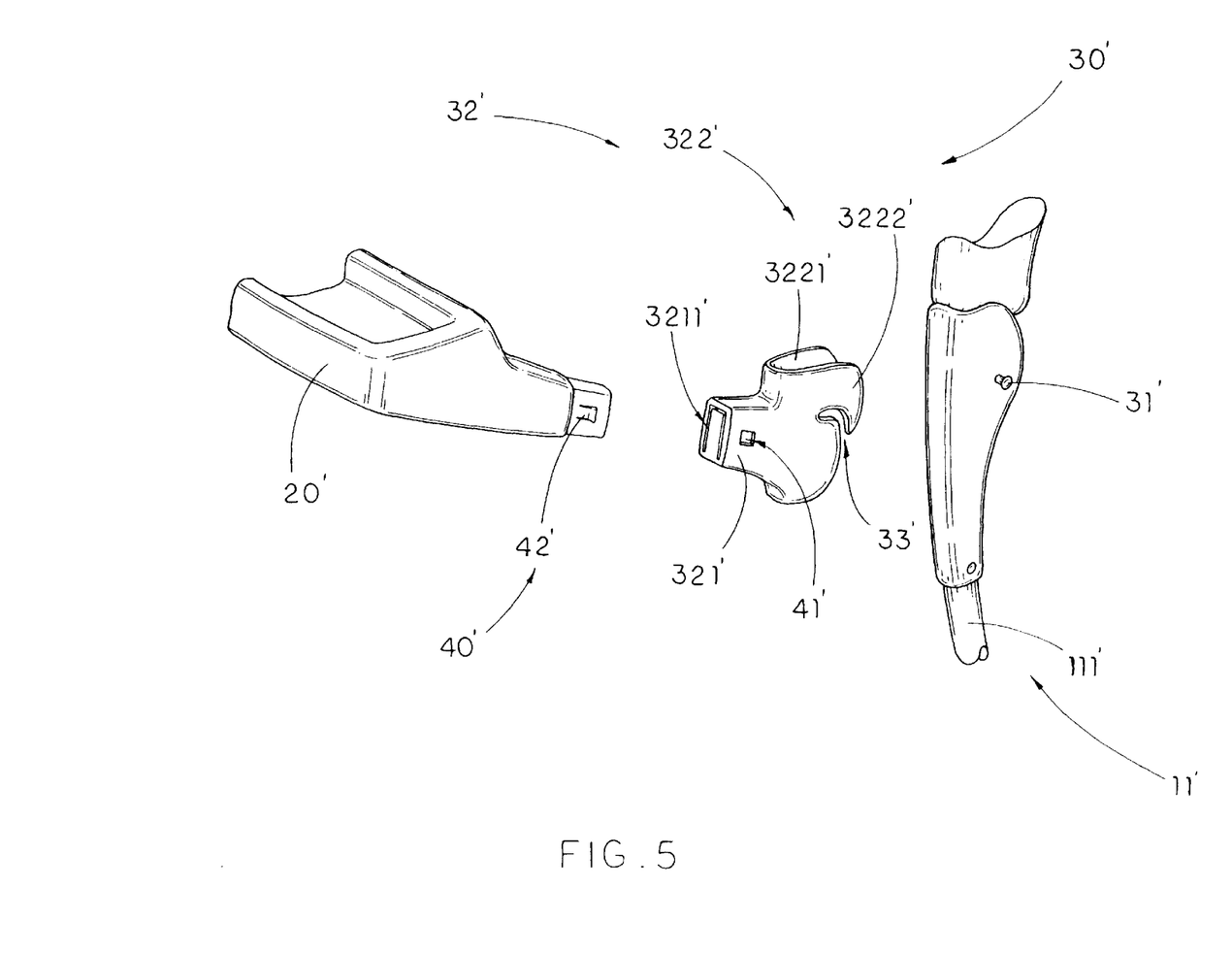
FIG. 5 is an exploded perspective view of the detachable mounting arrangement according to the above second preferred embodiment of the present invention.

As shown in FIG. 5, the head joint 321' of the joint member 32' comprises a U-shaped extending slot 3211' wherein the end of the front guard 20' having a U-shaped cross section is fittedly inserted into the extending slot 3211' so as to attach the front guard 20' to the coupling means 30'.

The detachable mounting arrangement 2' further comprises a pair of locking means 40' for locking up the two end of the front guard 20' to the coupling means 30' respectively wherein each of the locking means 40' has through locking slot 41' formed on a sidewall of the end portion of the joint member 32' and a locking flange 42' formed on a corresponding sidewall of an end portion of the front guard 20' wherein the locking flange 42' is engaged with the locking slot 41' when the end of the front guard 20' is inserted into the extending slot 3211' of the joint member 32', so as to securely lock up the front guard 20' to the coupling means 30'.

Figure 6:
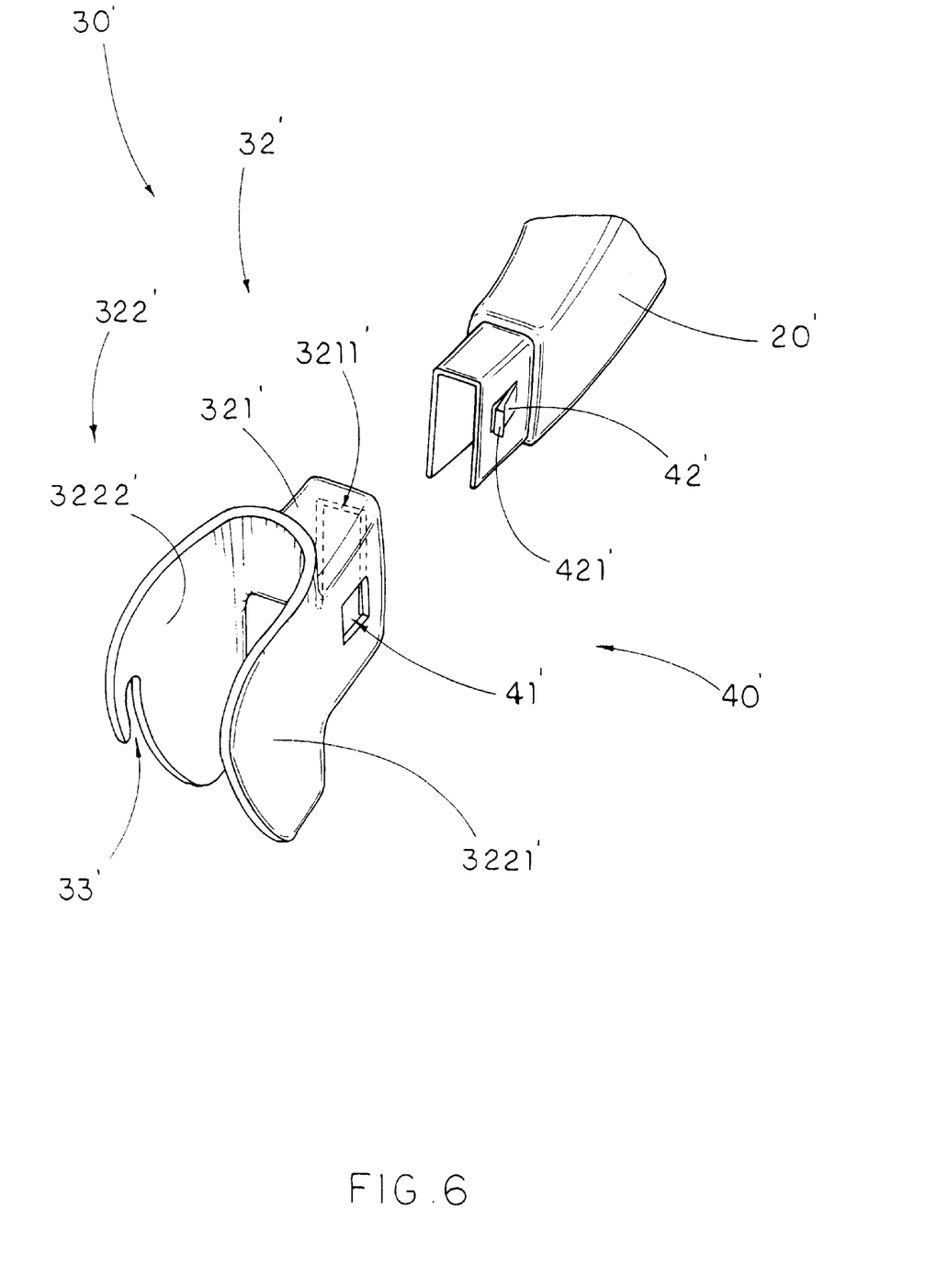
FIG. 6 is a partially perspective view of the detachable mounting arrangement according to the above second preferred embodiment of the present invention.

Accordingly, the locking flange 42' is formed by cutting through the sidewall of the front guard 20' wherein one end of the locking flange 42' is integrally extend from the sidewall of the front guard 20' while an opposed free end of the locking flange 42' is in a suspended manner, so as to provide a flexibility of the locking flange 42'. Thus, a locking tip 421' is integrally protruded from the free end of the locking flange 42' for blocking on the locking flange 42' out of the locking slot 41', so as to lock up the front guard 20' to the coupling means 30', as shown in FIG. 6.

Figure 7:
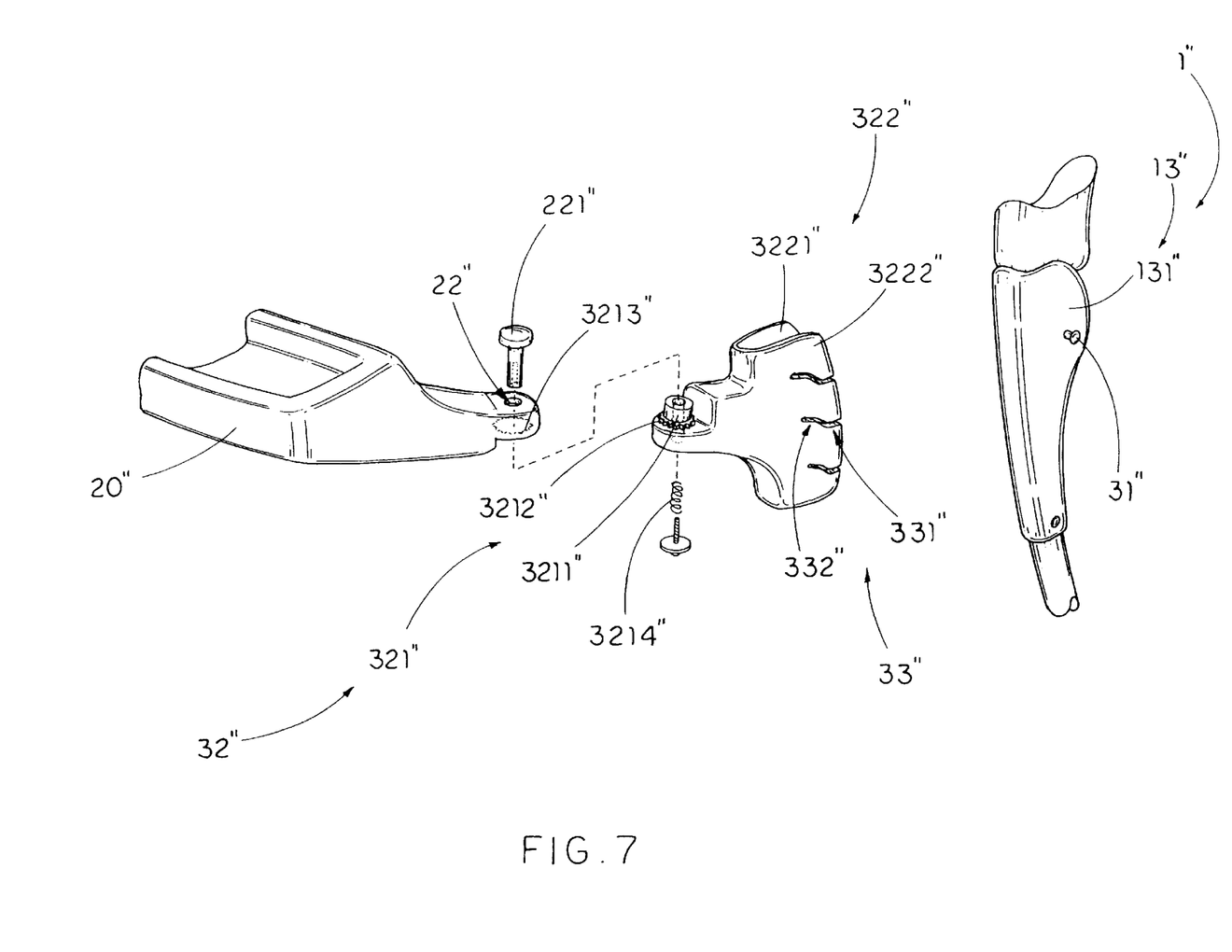
FIG. 7 is a perspective view of a detachable mounting arrangement according to a third preferred embodiment of the present invention.

Referring to FIG. 7, a third embodiment of the detachable mounting arrangement 2" illustrates another alternative mode of the above first and second embodiments of the present invention, wherein the detachable mounting arrangement 2" is adapted for selectively adjusting a mounting position on the foldable joints 131".

According to the third embodiment, each of the second secure members 33" of the coupling means 30" has at least two elongated locking slots 33" parallelly formed on the supporting wall 3222" of the base joint 322" of the joint member 32". Therefore, the locking shank of the first secure member 31" is selectively engaged with one of the locking slots of the second secure members 33", so as to adjust a position of the front guard 20" with respect to the seat frame 13" of the stroller 1".

Figure 8:
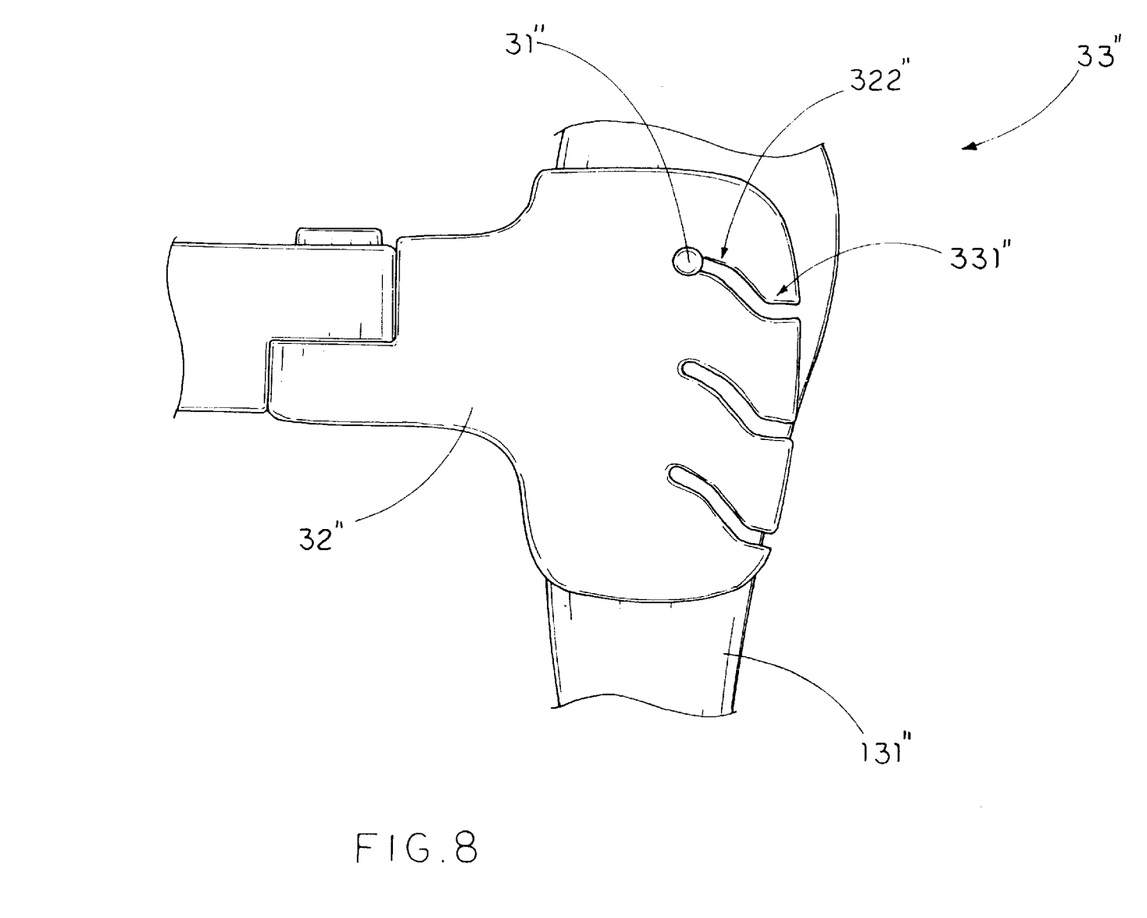
FIG. 8 is a partially side view of the detachable mounting arrangement according to the above third preferred embodiment of the present invention.

As shown in FIG. 8, each of the locking slots of second secure member 33" has a guiding portion 331" upwardly and inclinedly extended from the edge of the respective supporting wall 3222" to define a open end of the locking slot and a locking portion 332" transversely extended from the guiding portion 331" to define a closed end of the locking slot of the second secure member 33" wherein the locking shank 31" is adapted to fittedly slide on the locking slot 33" from the guiding portion 331" to the locking portion 332" thereof for mounting the joint member 32" on the folding joint 131", so as to securely lock up the front guard 20" on the stroller 1". It is worth to mention that the locking slot of the second secure member 33" is constructed by the guiding portion 331" and the locking portion 332" to form a bending shape, when the locking shank 31" is slidably located at the locking portion 322", the locking shank 31" is securely locked at such position by the upper and bottom walls 3221" so as to block up the up and down movement of the front guard 20" with respect to the stroller 1".

In order to detach the front guard 20" from the stroller 1", the parent must intentionally pull the front guard 20" forwardly to slide the locking shank 31" from the guiding portion 332" of the locking slot of the second secure member 33" towards to the guiding portion 331" thereof. Then, an inclined and upward force must be applied on the front guard 20" to slide the locking shank 31" out of the guiding portion 331" of the locking slot of the second secure member 33". In other words, in the locked position, the parent is able to pull the front guard 20" upwardly without detaching the front guard 20" from the stroller 1" such that it is safe for the parent to carry the stroller 1" by holding the front guard 20".

As shown in FIG. 7, the head joint 321" of the joint member 32" is rotatably connected the end of the front guard 20" in a sideward direction, which can be a food tray as mentioned in second embodiment, wherein the head joint 321" has an upwardly hollow protrusion 3211" rotatably mounted in a tubular holder 22" vertically provided at the end of the front guard 20" via a shaft 221" such that the two joint members 32" are capable of selectively folding inwardly and outwardly to fittedly adjust a distance between the two foldable joints 131" of the stroller 1".

In order to prevent an unwanted lateral movement of the joint member 32" with respect to the front guard 20", the joint member 32" further has a plurality of engaging teeth 3212" evenly formed on an outer surface of the protrusion 3211" for fittedly engaging with a plurality of engaging grooves 3213" evenly formed on an inner surface of the tubular holder 22", and a resilient element 3214" for applying an urging pressure for retaining the engaging teeth 3212" engaged with the engaging grooves 3213" respectively.

Accordingly, the resilient element 3214" is a compression spring disposed in the joint member 32" wherein the resilient element 3214" has two ends biasing against the protrusion 3211" and the shaft 221" respectively so as to normally pull the protrusion 3211" towards to the tubular holder 22". In order to turn the joint member 32" with respect to the front guard 20", a downward pulling force must be applied on the joint member 32" to move the protrusion 3211" out of the tubular holder 22". When the downward pulling force is released, the resilient element 3214" is automatically rebound to pull the protrusion 3211" back to the tubular holder 22", so as to engage the engaging teeth 3212" with the engaging grooves 3213", such that the joint member 32" is locked up with respect to the front guard 20" in a rotatably movable manner.

It is worth to mention that the front guard 20" of the third embodiment can be employed in the first and second embodiments to mount on the seat frame of the stroller without departing from the spirit and scope of the present invention.

In view of above, the detachable mounting arrangement for stroller front guard according to the present invention substantially achieves the following advantages:

(1) The detachable mounting arrangement has a simple and low cost structure while it also enable the front guard to be quickly and easily attached to and detached from the stroller.

(2) The attachment of the front guard is improved in both safety and operability. The front guard is interlocked with the stroller as in one single action and is advantageous in practical use.

(3) By means of the detachable mounting arrangement of the present invention, the front guard is securely mounted on the stroller frame by a pin-in-slot engagement so as to prevent up and down or sideward movement of the front guard with respect to the stroller. In other words, the front guard is firmly attached to the stroller even through an upward force is applied on the front guard to carry the stroller running up/down stairs.

(4) It does not require to alter the original structural design of the stroller, so as to minimize the manufacturing cost of incorporating the front guard with the stroller.

(5) The detachable front guard constructed with the detachable mounting arrangement is adapted to be installed to all kinds of stroller because no specific modification is required for the stroller to adapt the front guard.

(6) The front guard is interchangeable such as a hand bar or a food tray so as to fit the need of the user.

What is claimed is:

1. A stroller, comprising:
   a seat frame having two front legs constructed to support a fabric seat therebetween, a handle frame upwardly extended from said seat frame, wherein said seat frame further comprises a pair of foldable joints pivotally connected to two upper ends of said front legs with two lower ends of said handle frame so as to fold up said stroller; and
   a detachable mounting arrangement, comprising:
      a front guard, which has two ends, being transversely extended from said seat frame and positioned above said fabric seat to form a front boundary of said seat frame;
      two joint members provided at said two ends of said front guard for detachably mounting on said seat frame, wherein each of said joint members has a head joint connected to said respective end of said front guard and a base joint having two supporting walls fittedly mounted on said seat frame, wherein each of said joint members further has at least a locking slot provided on one of said supporting walls and an opening formed at an edge of said respective supporting wall; and
      two locking shanks which are provided on two sides of said seat frame and mounted on said two foldable joints respectively, wherein each of said locking shanks has a neck portion protruded from said seat frame and arranged to slide into said respective locking slot so as to lock up said joint member on said seat frame.

2. The stroller, as recited in claim 1, wherein said two supporting walls of said joint member have a distance therebetween that is slightly larger than a width of said respective foldable joint such that when said joint member is mounted on said foldable joint, two inner surfaces of said supporting walls are biased against said foldable joint in a sandwiched manner, so as to prevent an up and down and sideward movement of said joint member with respect to said foldable joint.

3. The stroller, as recited in claim 1, wherein two ends of said front guard are detachably connected to said two joint members respectively wherein said head joint of said joint member has a U-shaped extending slot such that said end of said front guard which has a U-shaped cross section is fittedly and slidably inserted into said extending slot so as to detachably attach said front guard to said joint member.

4. The stroller, as recited in claim 3, wherein a locking flange is formed by cutting through a sidewall of said front guard wherein one end of said locking flange integrally extends from said sidewall of said front guard while an opposed free end of said locking flange is in a suspended manner, so as to provide a flexibility of said locking flange.

5. A stroller, comprising:
   a seat frame having two front legs constructed to support a fabric seat therebetween, a handle frame upwardly extended from said seat frame, wherein said seat frame further comprises a pair of foldable joints pivotally connected two upper ends of said front legs with two lower ends of said handle frame so as to fold up said stroller; and
   a detachable mounting arrangement, comprising:
      a front guard, which has two ends, being transversely extended from said seat frame and positioned above said fabric seat to form a front boundary of said seat frame;
      two joint members provided at said two ends of said front guard for detachably mounting on said seat frame, wherein each of said joint members has a head joint connected to said respective end of said front guard and a base joint having two supporting walls fittedly mounted on said seat frame, wherein each of said joint members further has at least a locking slot provided on one of said supporting walls and an opening formed at an edge of said respective supporting wall, wherein each of said locking slots has a guiding portion upwardly and inclinedly extended from en edge of said respective supporting wall and a locking portion transversely extended from said guiding portion to form a closed end of said locking slot; and
      two locking shanks which are provided on two sides of said seat frame and mounted on said two foldable joints respectively, wherein each of said locking shanks has a neck portion protruded from said seat frame and arranged to slide into said respective locking slot so as to lock up said joint member on said seat frame, wherein each of said locking shanks is adapted to fittedly slide in said locking slot from said opening of said guiding portion to said locking portion towards said closed end for securely mounting said joint member on said seat frame.

6. The stroller, as recited in claim 5, wherein said two supporting walls of said joint member have a distance therebetween that is slightly larger than a width of said respective foldable joint such that when said joint member is mounted on said foldable joint, two inner surfaces of said supporting walls are biased against said foldable joint in a sandwiched manner, so as to prevent an up and down and sideward movement of said joint member with respect to said foldable joint.

7. The stroller, as recited in claim 6, wherein two ends of said front guard are detachably connected to said two joint members respectively, wherein said head joint of said joint member has a U-shaped extending slot such that said end of said front guard which has a U-shaped cross section is fittedly and slidably inserted into said extending slot so as to detachably attach said front guard to said joint member.

8. The stroller, as recited in claim 7, wherein a locking flange is formed by cutting through a sidewall of said front guard wherein one end of said locking flange integrally extends from said sidewall of said front guard while an opposed free end of said locking flange is in a suspended manner, so as to provide a flexibility of said locking flange.

* * * * *